Feb. 17, 1953 B. W. OLSON 2,628,397
HOLD DOWN CLAMP
Filed Sept. 11, 1950 2 SHEETS—SHEET 1
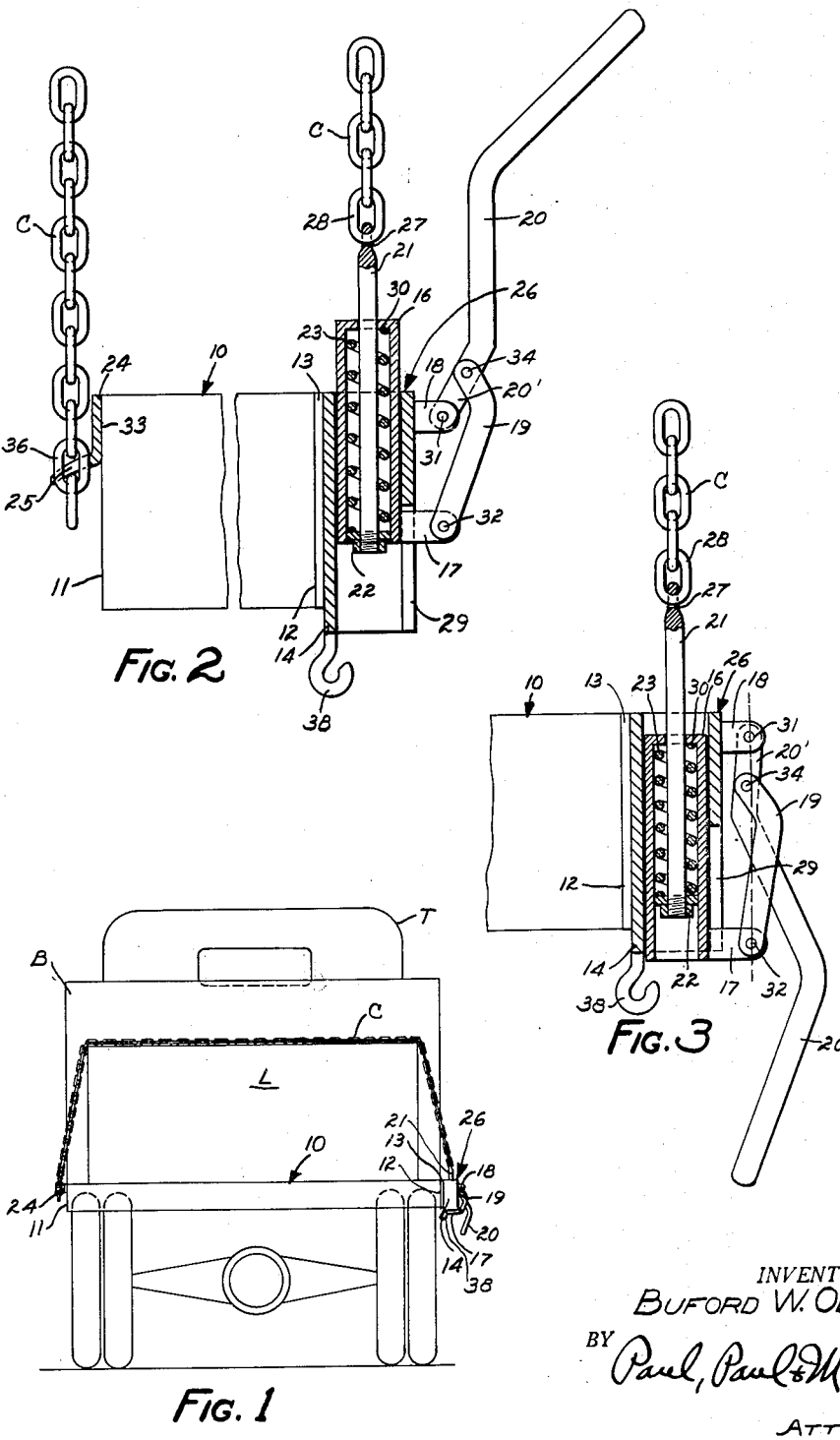
INVENTOR.
BUFORD W. OLSON
BY Paul, Paul & Moore
ATTORNEYS.

Feb. 17, 1953   B. W. OLSON   2,628,397
HOLD DOWN CLAMP

Filed Sept. 11, 1950   2 SHEETS—SHEET 2

INVENTOR.
BUFORD W. OLSON
BY Paul, Paul & Moore
ATTORNEYS

Patented Feb. 17, 1953

2,628,397

UNITED STATES PATENT OFFICE 2,628,397

HOLD DOWN CLAMP

Buford W. Olson, Hopkins, Minn.

Application September 11, 1950, Serial No. 184,137

3 Claims. (Cl. 24—68)

This invention relates to improved hold down clamps or load hold-down apparatus for attachment to the body of a truck, trailer or the like, by means of which loads on the body of the vehicle may be held snugly in contact therewith for transportation. In the placing of loads on vehicles for the purpose of transporting them without shifting of the load during such transporting, it is necessary to provide a quick, easy means of holding them tightly in contact with the vehicle body, yet one which will be resilient to a degree so as to allow a slight stretching of the hold-down means to compensate for the strains and distortions of the truck body during travel. It is also important to provide a means for resiliently holding a load to the body of the truck which is readily adaptable to a variety of different types of loads, and one which is susceptible to a variety of uses.

The ancient method of holding down a load on a truck or other vehicle is, of course, to tie it down with a rope. This has several distinct disadvantages, the paramount ones being that the rope tends to fray and break and that it is difficult to be able to tie the rope tightly. To obviate the difficulty of fraying rope, steel chains have been extensively used for load hold down apparatus, and are usually secured by hooks or similar means to hold the load down to the truck body.

To obviate the difficulty of lack of snugness has been a more difficult job. Various measures and means have been utilized in order to provide a hold-down apparatus which will readily hold the load to the truck body without cumbersome devices or undue labor. One of these measures has been simply to pass the chain around the load, in the manner of a piece of string around a box, and to hook it to the sides of the truck. This means that the chain will only be as tight as the strength of the man pulling it, and is not a very satisfactory method. Another measure to obviate the difficulty of lack of snugness has been the devising of various means to hold the load down which comprise a tensioning machine in which both ends of the chain are hooked to the truck body and the chain is then clamped in this device for tensioning. The tensioning machine then draws both ends towards the middle around the load. Usually a lever is involved to provide the tensioning, and this is then hooked or clamped to the chain. This measure has also not been satisfactory, nor is it versatile to a number of uses.

It is therefore an object of this invention to provide an improved hold down clamp which is attachable to a vehicle and is capable of freely engaging and tightly holding the load, yet one which is freely detachable from the vehicle for use upon diversified loads.

It is also an object of this invention to provide an improved hold down clamp having a resilient binding action and which is adapted to secure a load to a vehicle with extreme ease.

It is a further object of this invention to provide an improved hold down clamp which will snugly and resiliently engage the load to be held down.

It is a further object of this invention to provide an improved hold down clamp wherein resilient engagement of the load is accomplished by a single lever throw and the lever is then held in locked, engaged position by said resilient engagement of the load.

It is a further object of this invention to provide an improved hold down clamp of a type having a chain engaging the load to be held down, said chain anchored at one end to the vehicle or to the load itself, and pulled into holding position by lever operated resilient means, said chain then being held in closed or holding position by the action of the lever device.

It is also an object of this invention to provide a versatile hold down clamp adapted to be used for loads of various configurations.

It is moreover an object of this invention to provide a versatile hold down clamp adapted to be used for various purposes.

It is moreover an object of this invention to provide a hold down clamp having a chain engaging the load to be held and anchored to a vehicle yet which is readily removable and adapted for positioning between the ends of load engaging chains.

It is moreover an object of this invention to provide a hold down clamp which is adapted to provide a hold down clamp which is adapted to be positioned upon a load to be held, and anchor said load to a vehicle body.

Other and further objects of the invention are those inherent in the apparatus herein illustrated, described or claimed.

The invention is illustrated with reference to the drawings in which corresponding numerals refer to the same parts and in which:

Figure 1 is a rear elevational view of one type of truck with the hold down clamp mounted thereon and engaging a substantially square load;

Figure 2 is an enlarged view of the truck bed and hold down clamp of Figure 1, partly in section and showing the hold down clamp in open, or pre-operative position;

Figure 3 is a fragmentary view of the hold down clamp of Figure 2, partly in section and showing the clamp in closed or post-operative position;

Figure 5:
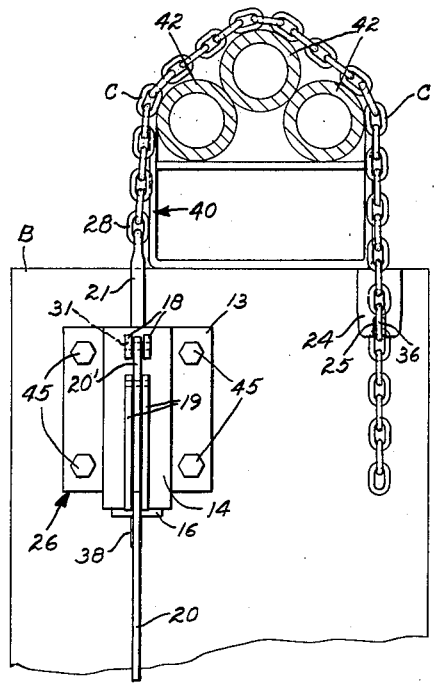
Figure 5 is an enlarged fragmentary rear elevational view of the truck illustrated in Fig. 4, the tubular load being shown in section, and showing the engagement of the tubular load by the hold down clamp.

Referring now to the drawings, Figures 1–3, there is illustrated a truck T having a body B and a load L. Load L is placed upon the truck bed generally designated 10. On the left side of the truck bed 10 there is placed the snatch hook 24, and on the right side of the truck bed there is placed the hold down clamp generally designated 26, as shown in Figure 1. Chain C is connected with the rod or spindle 21 of hold-down means 26 and extends across the load for engagement with snatch hook 24.

Chain C is a standard type chain composed of independent loops which normally intersect with each other at right angles. Other types of chains or cables could be used, and the hooks 24 would then be adapted for attachment thereto.

Snatch hook 24 is welded or bolted to the truck bed and may be placed in a variety of positions. In this case it is positioned on the truck bed at end 11, as shown at 33 in Figure 2. Extending downwardly from the flat welded portion 33 is hook portion which is provided with a slot 25 for the engagement of a link of chain C. The snatch hook is of the standard type well known in the art and, per se, forms no part of this invention. By means of the hook 24 any link of chain C can be held, thus allowing easy adjustment to loads of varying size.

The hold down clamp generally designated 26 is usually attached to the side of the platform upon which the load is to be held. Thus, in Figure 2 the hold-down 26 is on the right side of the truck frame 12 and is usually bolted thereon. However, it may be welded if desired. Snatch hook 24 is then placed on the opposite side or several hooks may be placed on the truck bed along the sides or recessed into the bottom, all for cooperation with the hold-down clamp 26. Upon the plate-like support 13 there is welded a length of tubing providing an elongated cylindrical member 14 which has a slot 29 extending lengthwise of the tubing through about half its length at the exposed side. Extending to the right from the upper end of the tube 14, as shown in Figure 2, and above the slot there is a pair of brackets 18 which form a pivot support 31 for the handle 20. Within this outer cylindrical member or tube 14 there is another tubular or second cylindrical member 16 which slides back and forth neatly on the inside of tube 14. The tube 16 has a lug or bracket at 17 which extends out through the slot 29 of the tube 14, the bracket 17 being also provided with a pivot at 32 to which there is pivotally attached on each side a pair of toggle links 19 which lie on either side of the bracket 17, the upper ends of the links 19 being pivoted at 34 to the handle 20. The links 19 act in unison as one member of a toggle, the cooperating toggle member being portion 20' of the handle between pivots 31 and 34.

It will thus be observed that when the handle 20 is raised, as shown in Figure 2, the tube 16 will be moved upwardly in the tube 14 to the position shown in Figure 2, and that when the handle 20 is lowered the tube 16 will be moved downwardly to the position shown in Figure 3. It will be noted that in the down position shown in Figure 3, the links 19 which form a complete toggle with the portion 20' of the handle 20 are in an over center and hence locking position because in the Figure 3 position the pivot 34 is slightly out of line and toward the tube 14 in respect to the dotted line which extends in Figure 3 through the centers of pivots 31 and 32.

The upper end of the tube or cylindrical member 16 has an inward flange at 30 which serves as a seat for a spring 23 that is nested inside the tube 16. The lower end of the spring 23 rests against an annular shoulder provided by a heavy washer that is retained by a nut 22 on the lower end of the rod or spindle 21, the outer end of the spindle being apertured at 27 to receive the link 28 of a binder chain C. When the handle is in the raised position of Figure 2 tension is released on the chain C and hence the spring 23 is in a relaxed condition, whereas when the handle 20 is in the position shown in Figure 3 the downward motion of the handle which is imparted through the downwardly moving tube 16 to the upper end of the spring 23 causes downward pressure through the spring 23 to be asserted against the washer and nut 22 and hence upon the spindle 28 and chain C. This force is then transmitted to the load L. The handle locks in the Figure 3 position due to the resilient action of the spring 23, holding the toggle 19—20' in over center position.

In operation, the load L is placed on the bed 10 of truck T, the lever 20 is raised to the position shown in Figure 2, the chain C is passed as snugly as possible over the load L, as shown in Figure 1, and a link, illustrated in the drawings by link 36, is then passed into the groove 25 of snatch hook 24 thereby making the chain fast to hook 24. Lever 20 is then operated from the upward position of Figure 2 into the downward position of Figure 3, urging spindle 21 resiliently downward by means of the action of lever 20 on link 19 and through link 19 on tube 16, thus forcing spring 23 and spindle 21 downwardly. Lever 20 is thus locked in this position by means of toggle 19—20' and spring 23 as described before.

Hook 38 is attached to the lower inner rim of cylinder 14 and made a part thereof. It is not used when the hold down clamp is in the position shown in Figures 1–5 and 7, but is provided so that versatility is added to the hold down clamp whereby it may be removed from the position or positions shown in Figures 1–5 and 7 and placed in the position shown in Figure 6 for embracing certain kinds of loads. While it is contemplated that normally the hold down clamp will be made with attached hook 38, it may be understood that this may be omitted if desired. Also, while it is the usual procedure to provide bolts 45 for attaching the hold down clamp to the truck body, so that it can be removed for variable positioning if desired, it may be understood that the hold down clamp may be welded or otherwise attached to the truck or other apparatus, if desired.

Figures 4 and 5 again show the hold down clamp 26 of Figures 1–3 but show it in a different position upon the rear of a utility truck and holding the tubular members 42 of a derrick upon a rectangular hollow support 40.

Figure 6:
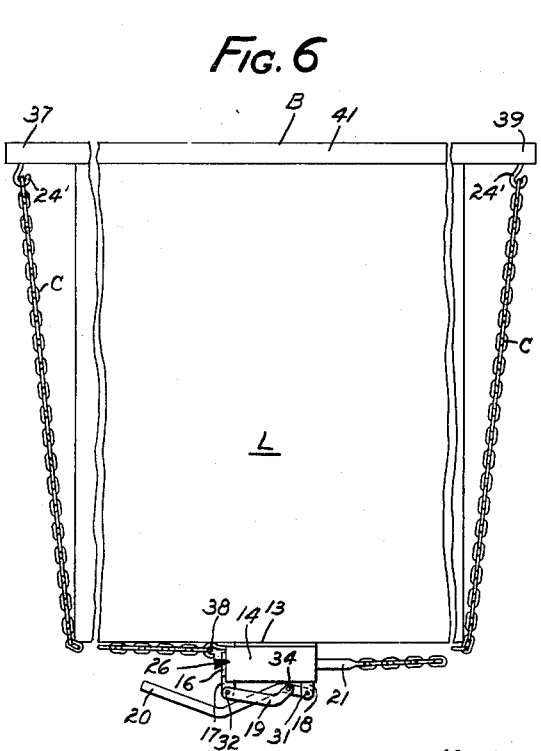
Figure 6 is a fragmentary plan view of the truck body of Figure 1 showing a modified positioning of the hold down clamp.
Figure 4:
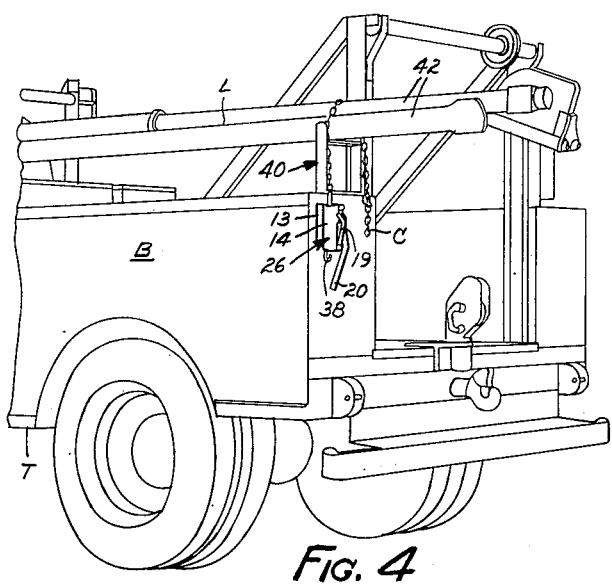
Figure 4 is a perspective view of a second type of truck with the hold down clamp mounted thereon and engaging a tubular load.

Figure 6 shows a rectangular load L placed upon a truck body and against a vertical body-wall 41. Hooks 24' are placed at either end 37 or 39 of the vertical body-wall 41, and the chains C are hooked thereto and extend horizontally around the load. Hold down clamp 26 is the same as that illustrated in Figures 1–5 but instead of being attached to the body of the truck has been removed therefrom and is positioned in the middle of the load between two sections of the chain C as shown in this Figure 6. One section of chain C extends from hook 24' at 37 to hook 38, and the other extends from hook 24' at 39 to spindle rod 21.

Figure 7:
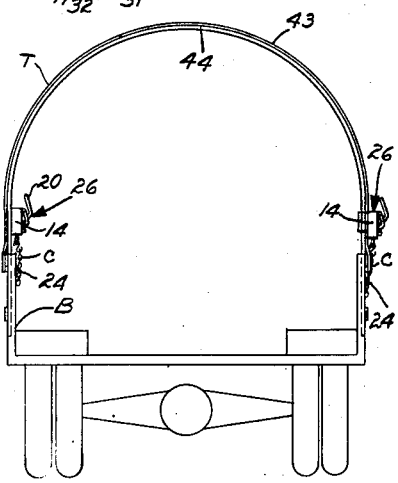
Figure 7 is a rear elevation of a third type of truck showing the hold down clamp attached to a canopy and securing the same to a truck frame.

Figure 7 illustrates another use and positioning of the hold down clamp 26, wherein the hold down clamp is attached to a canopy 43 and the snatch hooks 24 are attached to the body frame of the truck. Thus when the lever 20 is thrown, the truck canopy 43 is resiliently positioned upon the truck body frame and held thereto. Several clamps are provided as shown in the drawing, and they may be either positioned upon the inside of the canopy or upon the outside, as shown in the drawing, with corresponding positioning of the snatch hooks. As illustrated in the figure the canopy is of canvas stretched over frame members 44 and the hold down clamp is attached to said frame members. Conventional guides, not described, are utilized for guiding the frame members into position, and thus positioning the canopy on the body frame. The snatch hooks are positioned upon the body frame as shown.

Thus it will be seen from Figures 5–7 that the hold down clamp is readily adaptable to a variety of positionings and uses, so that loads of almost any type or configuration may be snugly, easily, resiliently engaged for transportation thereof.

As many apparently widely different embodiments of this invention may be made without departing from the spirit and scope thereof, it is to be understood that I do not limit myself to the specific embodiments herein.

What I claim is:

1. Means for tensioning a binder for a load resting on a support, comprising an outer elongated cylindrical member adapted to be secured to said support and having an open end, a second elongated cylindrical member disposed within said first cylindrical member and having an outer diameter substantially equal to the inner diameter of said first cylindrical member, said second cylindrical member having a radially inwardly directed flange adjacent one end thereof whose inner edge wall provides an aperture disposed axially of said second cylindrical member, an elongated rod extending through said aperture and into said second cylindrical member, said rod having binder engaging means on one end thereof externally of said second cylindrical member and having an annular shoulder adjacent the opposite end thereof slidably engageable with the inner wall of said second cylindrical member, a coil spring disposed within said second cylindrical member in surrounding relation to said rod and having its opposite ends respectively engageable with said flange and said annular shoulder, and manually operable means operatively engaged with said cylindrical members for moving said second cylindrical member axially inwardly of said first cylindrical member for compression of said spring between said flange and said annular shoulder, with said spring reacting on said annular shoulder for moving said rod axially inwardly of the said cylindrical members for tensioning said binder.

2. The structure according to claim 1, wherein said first cylindrical member is provided with an axially extending slot in its wall adjacent one end thereof, a lug projecting outwardly from said first cylindrical member adjacent its opposite end, a lug projecting outwardly from said second cylindrical member and through said slot, and said manually operable means comprising a pair of toggle links having corresponding ends thereof pivotally connected to said lugs.

3. Means for tensioning a binder for a load resting on a support, comprising a tubular member having an open end and being provided with means for effecting rigid connection thereof with said support, said tubular member being provided with an axially extending slot in the wall thereof diametrically opposed to said means, a second tubular member disposed within the open end of and guidingly engaged with said first tubular member for axial sliding movement therein, said second tubular member having an opening in one end thereof surrounded by a shoulder and having a lug extending through said slot, a rod extending through said opening with the outer end thereof provided with binder engaging means, the rod extending axially within said second tubular member and being provided with a shoulder adjacent its inner end, a coil spring confined within said second tubular member in surrounding relation to said rod and having its opposite ends engaging said shoulders, manually operable means including a pair of toggle links one of which is pivoted to said first tubular member and the other of which is pivoted to said lug, whereby upon operation of said toggle links toward aligned position thereof, said second tubular member will be moved axially within said first tubular member toward the open end thereof, with a resulting compression of the spring between said shoulders and the reaction of said compressed spring effecting restricted movement of said rod within first tubular member for yieldably tensioning said binder.

BUFORD W. OLSON.

REFERENCES CITED

The following references are of record in the file of this patent:

UNITED STATES PATENTS

| Number | Name | Date |
| --- | --- | --- |
| 572,054 | Gross | Nov. 24, 1896 |
| 1,885,824 | Hennicke | Nov. 1, 1932 |
| 1,904,102 | Thompson | Apr. 13, 1933 |

FOREIGN PATENTS

| Number | Country | Date |
| --- | --- | --- |
| 40,734 | France | May 17, 1932 |
| (Addition to No. 672,281) | | |